United States Patent
Nowicki et al.

(10) Patent No.: US 11,397,615 B2
(45) Date of Patent: Jul. 26, 2022

(54) METHODS AND APPARATUSES FOR COALESCING FUNCTION CALLS FOR RAY-TRACING

(71) Applicants: Tyler Bryce Nowicki, Mississauga (CA); Ahmed Mohammed Elshafiey Mohammed Eltantawy, Markham (CA)

(72) Inventors: Tyler Bryce Nowicki, Mississauga (CA); Ahmed Mohammed Elshafiey Mohammed Eltantawy, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 29 days.

(21) Appl. No.: 17/008,437

(22) Filed: Aug. 31, 2020

(65) Prior Publication Data
US 2022/0066819 A1    Mar. 3, 2022

(51) Int. Cl.
 G06F 9/48 (2006.01)
 G06F 9/38 (2018.01)
 G06T 15/00 (2011.01)

(52) U.S. Cl.
 CPC .......... *G06F 9/4881* (2013.01); *G06F 9/3802* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 7,340,040 B1* | 3/2008 | Saylor | G06Q 40/00 379/67.1 |
| 8,995,628 B2* | 3/2015 | Zirngibl | H04M 3/42153 379/88.22 |
| 10,102,374 B1* | 10/2018 | Cohen | G06F 9/545 |
| 10,699,362 B2* | 6/2020 | Ashar | G06F 9/45533 |
| 2008/0122846 A1 | 5/2008 | Brown et al. | |
| 2014/0240316 A1 | 8/2014 | Engle | |

(Continued)

FOREIGN PATENT DOCUMENTS

CN    102947865 A    2/2013

OTHER PUBLICATIONS

Wald I., Slusallek P., Benthin C. (2001) Interactive Distributed Ray Tracing of Highly Complex Models. In: Gortler S.J., Myszkowski K. (eds) Rendering Techniques 2001. Eurographics. Springer, Vienna.

(Continued)

*Primary Examiner* — Michael J Cobb

(57) ABSTRACT

Methods and systems for executing threads in a thread-group, for example for ray-tracing. The threads are processed to collect, for each thread, a respective set of function call indicators over a respective number of call instances. The function call indicators are reordered across all threads and all call instances, to coalesce identical function call indicators to a common call instance, and non-identical function call indicators are reordered to different call instances. Function calls are executed across the threads of the thread-group, according to the reordered and coalesced function call indicators. In ray-tracing applications, the threads represent rays, each call instance is a ray-hit of a ray, and each function call is a shader call.

20 Claims, 15 Drawing Sheets

(56) References Cited

U.S. PATENT DOCUMENTS

| | | | |
|---|---|---|---|
| 2016/0179884 A1* | 6/2016 | Jerzak | G06F 16/2455 707/718 |
| 2017/0185338 A1* | 6/2017 | Kumar K.M. | G06F 3/0631 |
| 2019/0018687 A1* | 1/2019 | Falkenberg | G06F 9/485 |
| 2020/0074723 A1 | 3/2020 | Smith | |
| 2020/0327635 A1* | 10/2020 | Koker | G06F 9/5011 |

OTHER PUBLICATIONS

Ingo Wald, Solomon Boulos, and Peter Shirley. 2007. Ray tracing deformable scenes using dynamic bounding volume hierarchies. ACM Trans. Graph. 26, 1 (Jan. 2007), 6-es.

Ingo Wald, Christiaan Gribble, Solomon Boulos, and Andrew Kensler. 2007. SIMD Ray Stream Tracing—SIMD Ray Traversal with Generalized Ray Packets and Onthe-fly Re-Ordering. Technical Report.

C. P. Gribble and K. Ramani, "Coherent ray tracing via stream filtering," 2008 IEEE Symposium on Interactive Ray Tracing, Los Angeles, CA, 2008, pp. 59-66.

Bochang Moon, Yongyoung Byun, Tae-Joon Kim, Pio Claudio, HyeSun Kim, Yun-Ji Ban, Seung Woo Nam, and Sung-Eui Yoon. 2010. Cache-oblivious ray reordering. ACM Trans. Graph. 29, 3, 28:1-28:10.

Steven G. Parker, Heiko Friedrich, David Luebke, Keith Morley, James Bigler, Jared Hoberock, David McAllister, Austin Robison, Andreas Dietrich, Greg Humphreys, Morgan McGuire, and Martin Stich. 2013. GPU ray tracing. Commun. ACM 56, 5 (May 2013), 93-101.

Solomon Boulos et al., "Adaptive Ray Packet Reordering", IEEE/EG Symposium on Interactive Ray Tracing Aug. 9-10, 2008, Los Angeles, California, USA,978-1-4244-2741-3/08/$25.00 2008 IEEE,total:8pages.

* cited by examiner

| Ray-Hit # | 1 | 2 | 3 | 4 | 5 | 6 | 7 | 8 | 9 | 10 | 11 | 12 |
|---|---|---|---|---|---|---|---|---|---|---|---|---|
| Thread #1 | I1 | | | | | | | | | | | |
| Thread #2 | A2 | | | | | | | | | | | |
| Thread #3 | I4 | | | | | | | | | | | |
| Thread #4 | A5 | | | | | | | | | | | |
| Cost | 4 | | | | | | | | | | | |

FIG. 3A

| Ray-Hit # | 1 | 2 | 3 | 4 | 5 | 6 | 7 | 8 | 9 | 10 | 11 | 12 |
|---|---|---|---|---|---|---|---|---|---|---|---|---|
| Thread #1 | I1→ | A1↙ | A2 | | | | | | | | | |
| Thread #2 | A2↑ | I1↑ | A5 | | | | | | | | | |
| Thread #3 | I4↔ | A4↑ | A5 | | | | | | | | | |
| Thread #4 | A5↑ | I3↑ | A3 | | | | | | | | | |
| Cost | 4 | 4 | 3 | | | | | | | | | |

FIG. 3B

| Ray-Hit # | 1 | 2 | 3 | 4 | 5 | 6 | 7 | 8 | 9 | 10 | 11 | 12 |
|---|---|---|---|---|---|---|---|---|---|---|---|---|
| Thread #1 | I1→ | A1✓ | A2✓ | I3r | A2r | I4← | A4r | A2✓ | A2r | A5✓ | A5✓ | C3 |
| Thread #2 | A2r | I1r | A5r | I3← | A3r | A2r | I4r | A5r | A2r | A2r | M | |
| Thread #3 | I4← | A4r | A5r | I1← | A1r | A5r | I3r | A2r | A2r | A2r | A2r | M |
| Thread #4 | A5r | I3← | A3✓ | A2 | I1r | A5r | A2r | I4r | A2✓ | A2✓ | C2 | |
| Cost | 4 | 4 | 3 | 3 | 4 | 3 | 4 | 3 | 1 | 2 | 4 | 2 |

FIG. 3C

| Ray-Hit # | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Thread #1 | I1→ | A1✓ | A2✓ | A2✓ | A2r | A2r | I3r | | I4→ | A4r | A5✓ | A5✓ | C5 | |
| Thread #2 | I1r | | A2r | A2r | A2r | A2r | I3→ | A3r | I4r | | A5r | A5r | | M |
| Thread #3 | I1→ | A1r | A2r | A2r | A2r | A2r | I3r | | I4→ | A4r | A5r | A5r | | M |
| Thread #4 | I1r | | A2r | A2✓ | A2✓ | A2 | I3→ | A3✓ | I4r | | A5r | A5r | C2 | |
| Cost | 1 | 1 | 1 | 1 | 1 | 1 | 1 | 1 | 1 | 1 | 1 | 1 | 2 | 1 |

FIG. 4

```
traceRayEXT(ray)
    committed_hit.found = false;
    num_rays = initializeRayHits(ray)
    // collect all initial PCs & send them to a memory coalescing unit (function call coalescing unit)
    while(hasUnprocessedRayHits(ray)) {
        {hit.SBTOffset, hit.isAABB, hit.Index}=getNextRayBasicInfo();                 ← 612
        if(hit.isAABB)
            hit.pc=getIntersection&AnyHitShader(hit.SBTOffset);                        ← 614
            queue_to_coalesce_raytrace_hit (pc,hit.Index);                             ← 616a
        else
            pc=getAnyHitShader(hit.SBTOffset) ;
            queue_to_coalesce_raytrace_hit (pc,hit.Index);                             ← 616b
    }
    // execute the function calls
    for(i=0; i<num_rays; ) {
        {hit.pc, hit.Index} = pop_next_raytrace_hit();                                 ← 622
        if(isValid(hit_pc)) {
            i++;
            hit = getNextRayHit(hit_Index);
            res = UniformCall(hit.pc, hit);                                            ← 624
            .....
        }
    }
```

FIG. 6A

```
while(hasUnprocessedRayHits(ray)) {
  {hit.instance_id hit.isAABB, hit.Index}=getNextRayBasicInfo();   ← 618
  queue_to_coalesce_raytrace_hit(hit.instance_id,hit.Index);
}
```
⎫
⎬ 610a
⎭

FIG. 6B

```
for(i=0; i<num_rays; ) {
  {hit.instance_id, hit.Index} = pop_next_raytrace_hit();
  if(isValid(hit.instance_id)) {
    hit.pc = getShader(hit.instance_id);
    i++;
    hit = getNextRayHit(hit_Index);
    if (!hit.is_opaque)   ← 626
      res = UniformCall(hit.pc, hit);
    .....
  }
}
```
⎫
⎬ 620a
⎭

FIG. 6C

```
for(i=0; i<num_rays; ) {
    {hit.instance_id, hit.Index, hit.ignore} = pop_next_raytrace_hit();  ─── 628a
    if(isValid(hit.instance_id) && !hit.ignore) {
        hit.pc = getShader(hit.instance_id);
        i++;
        hit = getNextRayHit(hit_Index);
        res = UniformCall(hit.pc, hit);
        if(res.nodup_flag_and_any_hit_ignored_ray_hit) {  ─── 628b
            ignore_subsequence_raytrace_hits(hit.instance_id);
        }
        .....
    }
}
```

METHODS AND APPARATUSES FOR COALESCING FUNCTION CALLS FOR RAY-TRACING

RELATED APPLICATIONS

This is the first patent application for the present disclosure.

FIELD

The present disclosure relates to methods and apparatuses for rendering images using ray-tracing, in particular methods and apparatuses for coalescing function calls in ray-tracing.

BACKGROUND

Ray-tracing is a technique for rendering a two-dimensional (2D) image by simulating the path traveled by a virtual ray of light from a virtual camera (corresponding to the view point of the 2D image), through a pixel of a 2D viewing plane, into a three-dimensional (3D) virtual scene. Each virtual ray is traced to determine whether the ray intersects with one or more surfaces of objects in the 3D virtual scene. Depending on whether the ray hits or misses an object, a visual effect is rendered. Each virtual ray is simulated to behave like an actual ray of light, with reflections, refractions and to cause shadows.

Ray-tracing can create rendered images that appear more realistic, however the computational cost can be high. The computational resources (e.g., computing time, memory resources, etc.) required to render an image using ray-tracing, especially for a scene having many objects, can limit the practical applications of ray-tracing.

It would be useful to provide techniques that help to reduce the computational cost of ray-tracing.

SUMMARY

The present disclosure describes example methods and apparatuses that helps to reduce computation time, by reordering and coalescing calls to shaders. This helps to reduce the computational cost of ray-tracing, and may enable ray-tracing to be useful in more practical applications.

Examples of the present disclosure may be implemented using the memory access coalescing hardware unit existing in conventional graphical processing units, and additionally a merge coalesced accesses hardware unit and function call coalescing memory buffer as disclosed.

In some examples, the disclosed ray-tracing technique may be implemented using instructions coded into hardware, which may provide greater performance and power savings.

In some examples, additional efficiency may be achieved by prefetching instructions for a coalesced function call.

Examples disclosed herein are described in the context of ray-tracing; however, the present disclosure may be applicable to execution of threads in other contexts, and the function calls that are coalesced are not limited to shader calls.

In some example aspects, the present disclosure describes a method for thread execution, the method including: processing a set of threads belonging to a thread-group to collect, for each thread, a respective set of function call indicators over a respective number of call instances; reordering the function call indicators across all threads and all call instances, to coalesce identical function call indicators to a common call instance, and wherein non-identical function call indicators are reordered to different call instances; and executing function calls across the threads of the thread-group, according to the reordered and coalesced function call indicators.

In any of the examples, executing function calls may include: prefetching instructions for a function call indicated by a function call indicator corresponding to a subsequent call instance, concurrent with execution of a function call indicated by a function call indicator corresponding to a current call instance.

In any of the examples, reordering the function call indicators may include: reordering non-identical function call indicators, which indicate memory addresses close to each other, to be assigned to consecutive call instances.

In any of the examples, reordering the function call indicators may include: writing identical function call indicators to a common row in a buffer, non-identical function call indicators being written to different rows in the buffer; and executing function calls may include: executing function calls indicated by function call indicators retrieved row by row from the buffer.

In any of the examples, the function call indicators may be function call pointers.

In any of the examples, reordering the function call indicators may include: for each given call instance, coalescing identical function call indicators across the threads in the thread-group, to obtain a set of coalesced function call indicators for the given call instance; and reordering the coalesced function call indicators across all call instances to place identical coalesced function call indicators at the common call instance.

In any of the examples, the threads may represent rays in a ray-tracing process, each call instance in a thread may correspond to a ray-hit of a ray, and each function call may correspond to a shader call.

In any of the examples, the respective set of function call indicators collected for each ray may include at least one of: a function call indicator to an any-hit shader, a function call indicator to an intersection shader, or a function call indicator to a combined any-hit and intersection shader.

In any of the examples, each function call may be associated with an object instance and a shader, and executing function calls may include: determining that a given object instance associated with a function call to an any-hit shader is flagged as opaque; and omitting execution of the function call to the any-hit shader for the given object instance.

In any of the examples, each function call may be associated with an object instance and a shader, and executing function calls may include: executing a function call to an any-hit shader for a given object instance; and after determining that the function call returns a decision to ignore a hit for the given object instance, omitting execution of subsequent function calls associated with the given object instance.

In some example aspects, the present disclosure describes an apparatus for thread execution, the apparatus including: a graphics processing unit (GPU) configured to: process a set of threads belonging to a thread-group to collect, for each thread, a respective set of function call indicators over a respective number of call instances; reorder the function call indicators across all threads and all call instances, to coalesce identical function call indicators to a common call instance, and wherein non-identical function call indicators are reordered to different call instances; and execute function calls across the threads of the thread-group, according to the reordered and coalesced function call indicators.

In any of the examples, the GPU may be further configured to execute function calls by: prefetching instructions for a function call indicated by a function call indicator corresponding to a subsequent call instance, concurrent with execution of a function call indicated by a function call indicator corresponding to a current call instance.

In any of the examples, the GPU may be further configured to reorder the function call indicators by: reordering non-identical function call indicators, which indicate memory addresses close to each other, to be assigned to consecutive call instances.

In any of the examples, the GPU may be further configured to reorder the function call indicators by: writing identical function call indicators to a common row in a function call coalescing buffer, non-identical function call indicators being written to different rows in the function call coalescing buffer; and the GPU may be further configured to execute function calls by: executing function calls indicated by function call indicators retrieved row by row from the function call coalescing buffer.

In any of the examples, the GPU may include: a memory coalescing unit; and a merge coalesced accesses unit. The memory coalescing unit and the merge coalesced accesses unit may be configured to reorder the function call indicators by: at the memory coalescing unit: for each given call instance, coalescing identical function call indicators across the threads in the thread-group, to obtain a set of coalesced function call indicators for the given call instance; and at the merge coalesced accesses unit: reordering the coalesced function call indicators across all call instances to place identical coalesced function call indicators at the common call instance.

In any of the examples, the threads may represent rays in a ray-tracing process, each call instance in a thread may correspond to a ray-hit of a ray, and each function call may correspond to a shader call.

In any of the examples, the respective set of function call indicators collected for each ray may include at least one of: a function call indicator to an any-hit shader, a function call indicator to an intersection shader, or a function call indicator to a combined any-hit and intersection shader.

In any of the examples, each function call may be associated with an object instance and a shader, and the GPU may be further configured to execute function calls by: determining that a given object instance associated with a function call to an any-hit shader is flagged as opaque; and omitting execution of the function call to the any-hit shader for the given object instance.

In any of the examples, each function call may be associated with an object instance and a shader, and the GPU may be further configured to execute function calls by: executing a function call to an any-hit shader for a given object instance; and after determining that the function call returns a decision to ignore a hit for the given object instance, omitting execution of subsequent function calls associated with the given object instance.

In some example aspects, the present disclosure describes a computer readable medium having instructions stored thereon. The instructions, when executed by a graphics processing unit (GPU), cause the GPU to: process a set of threads belonging to a thread-group to collect, for each thread, a respective set of function call indicators over a respective number of call instances; reorder the function call indicators across all threads and all call instances, to coalesce identical function call indicators to a common call instance, and wherein non-identical function call indicators are reordered to different call instances; and execute function calls across the threads of the thread-group, according to the reordered and coalesced function call indicators.

In some examples, the computer readable medium may include instructions to cause the GPU to perform any of the methods described herein.

BRIEF DESCRIPTION OF THE DRAWINGS

Reference will now be made, by way of example, to the accompanying drawings which show example embodiments of the present application, and in which:

FIGS. 3A-3C are tables that illustrate an example of thread divergence in a thread-group;

FIG. 4 is a table that illustrate an example of reordering and coalescing function calls for the thread-group of FIGS. 3A-3C;

FIGS. 6A-6D shows example pseudocode that may be used to implement the method of FIG. 5B.

Similar reference numerals may have been used in different figures to denote similar components.

DESCRIPTION OF EXAMPLE EMBODIMENTS

Figure 1A:
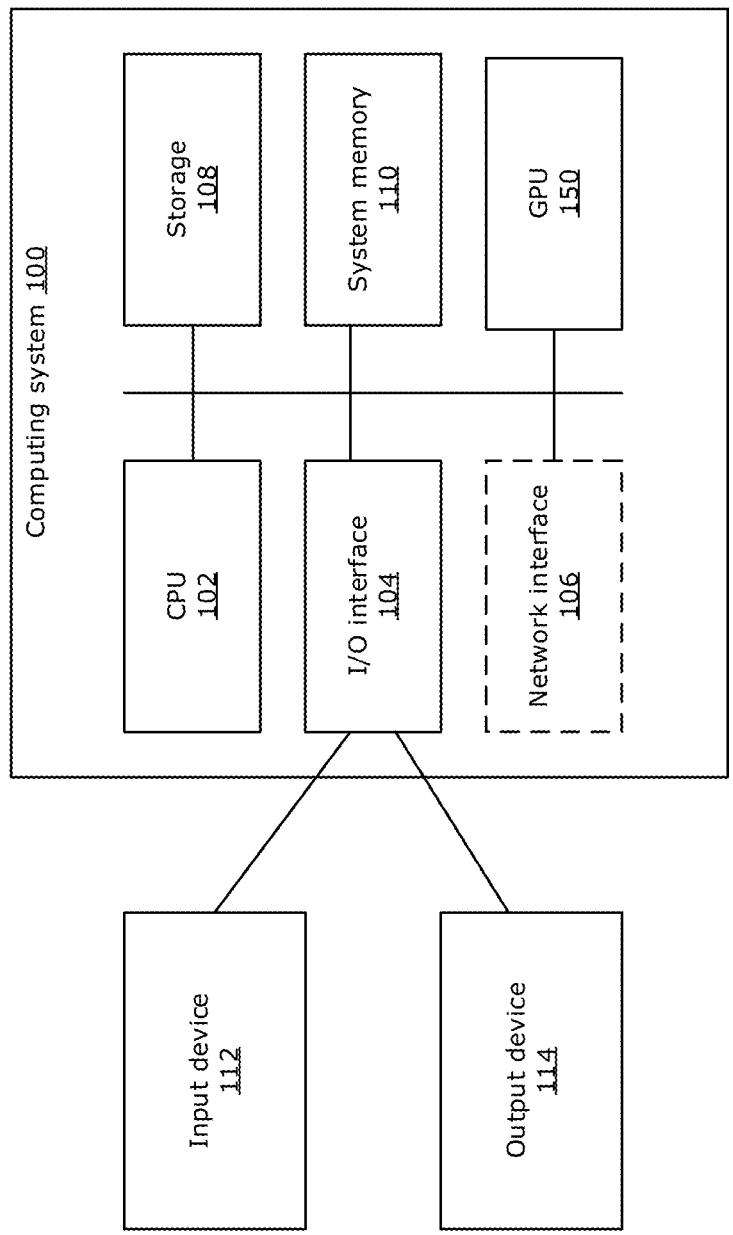
FIGS. 1A and 1B are block diagrams of an example computing system and an example GPU, respectively, in which examples described herein may be implemented.

FIG. 1A is a block diagram of an example computing system 100 that may be used to implement examples disclosed herein. For example, the computing system 100 may be a desktop computing system, a laptop, a tablet, a workstation, etc. Other computing system suitable for implementing examples described in the present disclosure may be used, which may include components different from those discussed below. Although FIG. 1A shows a single instance of each component, there may be multiple instances of each component in the computing system 100 and the computing system 100 could be implemented using parallel and/or distributed architecture.

In this example, the computing system 100 includes a central processing unit (CPU) 102, which may include a processor, a microprocessor, an application-specific integrated circuit (ASIC), a field-programmable gate array (FPGA), a dedicated logic circuitry, or combinations thereof. The computing system 100 may also include an input/output (I/O) interface 104, to enable interfacing with one or more input devices 112 and/or output devices 114. The input device(s) 112 (e.g., a keyboard, a mouse, a microphone, a touchscreen, and/or a keypad) and output device(s) 114 (e.g., a display, a speaker and/or a printer) are shown as external to the computing system 100. In other examples, one or more of the input device(s) 112 and/or the output device(s) 114 may be included as a component of the computing system 100.

The computing system 100 optionally includes a network interface 106, which may enable the computing system 100 to receive and transmit communications over a network (e.g., over a wired network or a wireless network).

The computing system 100 includes one or more storage units 108, which may include a mass storage unit such as a solid state drive, a hard disk drive, a magnetic disk drive and/or an optical disk drive. The computing system 100 also includes a system memory 110, which may include a volatile or non-volatile memory (e.g., a flash memory, a random access memory (RAM), and/or a read-only memory (ROM)). The system memory 110 and/or the storage 108 may store instructions for execution by the CPU 102. For example, the system memory 110 and/or the storage 108 may include software instructions, such as for implementing an operating system (OS), and other applications/functions. In some examples, instructions may also be provided by an external memory (e.g., an external drive in wired or wireless communication with the computing system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The computing system 100 includes a graphics processing unit (GPU) 150. The GPU 150 may be a removable component of the computing system 100 (e.g., provided on a removable graphics card) or may be integrated with the CPU 102, on a motherboard of the computing system 100. In some examples, the GPU 150 may be an external component that is connected to the computing system 100 (e.g., via an external port of the computing system 100). The GPU 150 is typically capable of parallel processing of a very high number of processes, compared to the CPU 102. The CPU 102 may call on the GPU 150 to perform certain specialized operations (e.g., rendering complex graphics, performing machine learning, processing large data, etc.). Various architectures may be used to implement the GPU 150, an example of which will be described with reference to FIG. 1B.

Figure 1B:
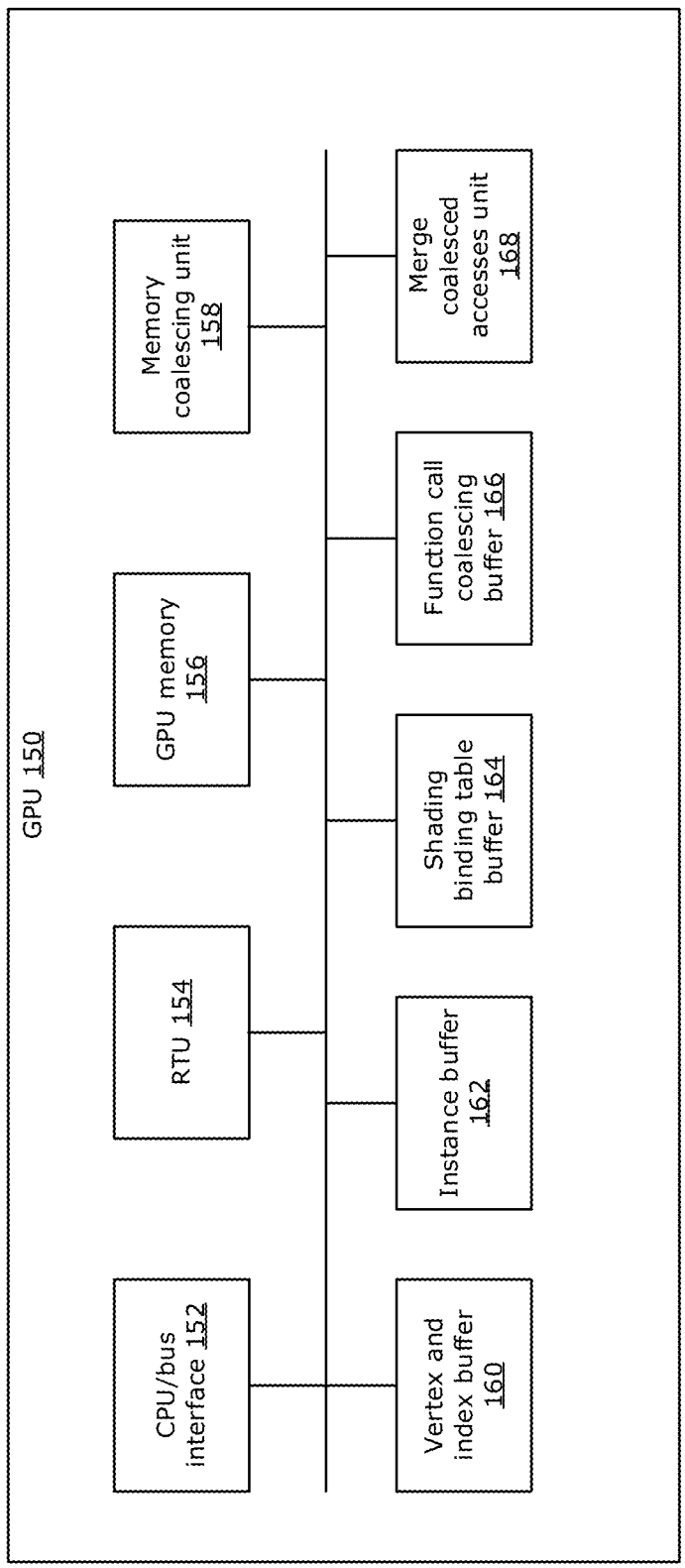

FIG. 1B is a block diagram illustrating an example architecture of the GPU 150. Although FIG. 1B shows a single instance of each component, there may be multiple instances of each component in the GPU 150. Further, the example architecture of FIG. 1B is provided only for the purpose of illustration, and is not intended to be limiting. It should be understood that examples disclosed herein may be implemented using other suitable architectures for the GPU 150.

The GPU 150 in this example includes a CPU/bus interface 152, enabling the GPU 150 to communicate with the CPU 102. The GPU 150 also includes ray-tracing unit (RTU) 154 which performs specialized operations related to ray-tracing, such as build accelerated structures and computing intersections with rays (discussed further below). The RTU 154 may be a processor, a microprocessor, an ASIC, a FPGA, a dedicated logic circuitry, or combinations thereof. In some examples, instead of the RTU 154 (which may be specialized for ray-tracing processes), the GPU 150 may have any other suitable execution unit for thread execution. Such an execution unit may be a processor, a microprocessor, an ASIC, a FPGA, a dedicated logic circuitry, or combinations thereof. The GPU 150 includes its own GPU memory 156, which may be accessed to retrieve instructions for executing shaders, as discussed further below. In some examples, instead of having a GPU memory 156, the GPU 150 may instead make use of the general system memory 110 of the computing system 100.

The GPU 150 includes a memory coalescing unit 158, which may be a processor, a microprocessor, an ASIC, a FPGA, a dedicated logic circuitry, or combinations thereof. The memory coalescing unit 158 is a hardware unit that operates to coalesce memory addresses, for example by grouping memory addresses such that a block of memory is retrieved to satisfy multiple memory access requests at the same time. The GPU 150 includes memory buffers, which are hardware memory components for temporary storage of data (e.g., to hold required data during execution of instructions). In this example, the GPU 150 includes a vertex and index buffer 160, an instance buffer 162, a shading binding table buffer 164 and a function call coalescing buffer 166, the use of which will be discussed further below.

The GPU 150 includes a merge coalesced accesses hardware unit 168, which may be a processor, a microprocessor, an ASIC, a FPGA, a dedicated logic circuitry, or combinations thereof. The merge coalesced accesses unit 168 operates, in cooperation with the memory coalescing unit 158 and the function call coalescing buffer 166, to coalesce function calls (and in particular shader calls) for ray-tracing, discussed further below.

The example GPU 150 of FIG. 1B includes some components that have been described in the context of ray-tracing. It should be understood that examples of the present disclosure may be implemented using other GPU architectures, and components described above may be used for applications other than ray-tracing.

To assist in understanding the present disclosure, ray-tracing is now discussed. Ray-tracing may be implemented using various techniques. An interface has been standardized by the Khronos Group, which separates rendering concepts (e.g., lights, shadows, etc.) from the computational concepts.

Figure 2:
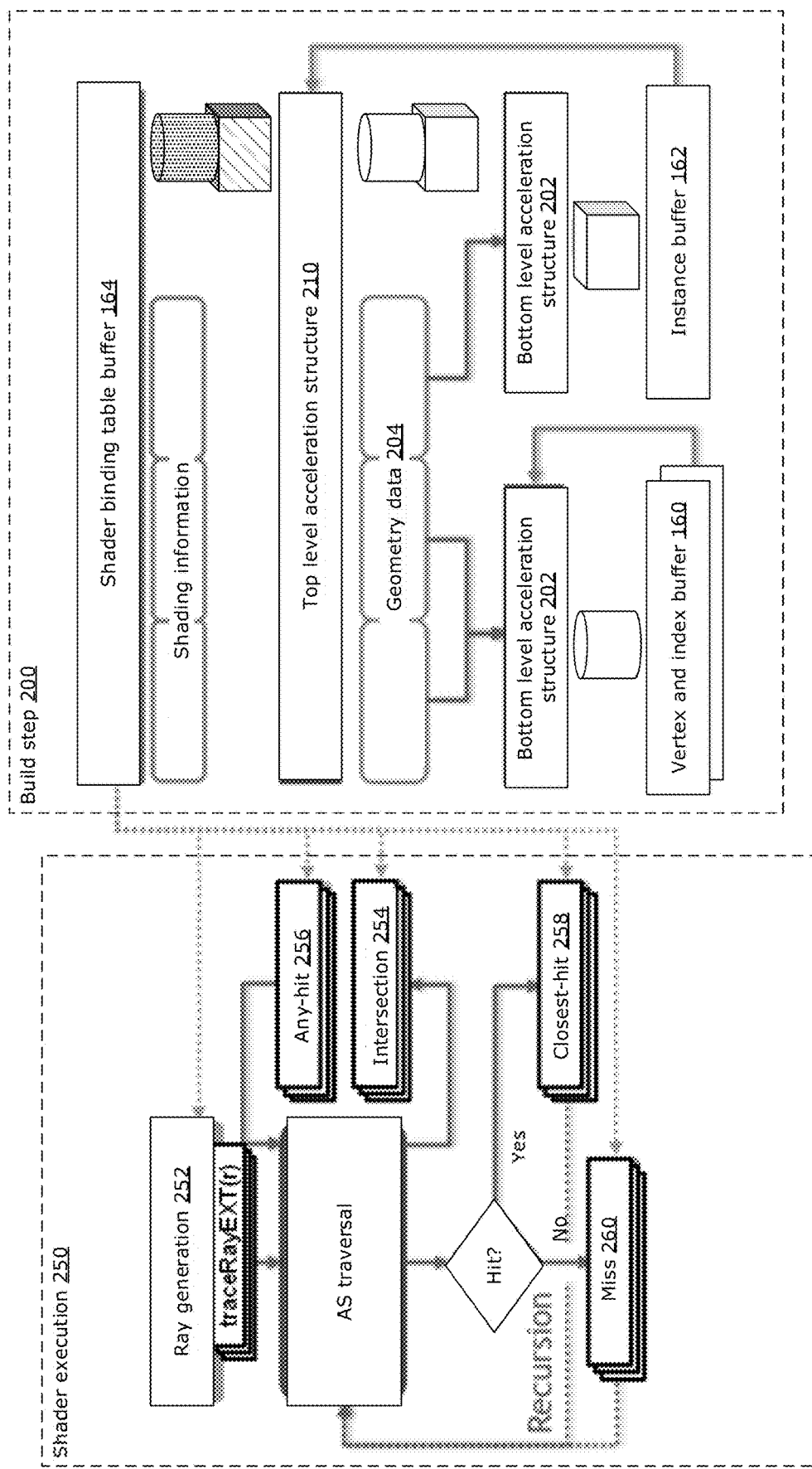
FIG. 2 is a diagram illustrating an example dataflow that may be implemented for ray-tracing.

FIG. 2 illustrates, conceptually, the data flow (or "pipeline") for ray-tracing, in accordance with defined standards.

A virtual scene is built in a build step 200, using acceleration structures. An acceleration structure (AS) is used to define objects in the 3D scene, using a tree-based (typically two-level) hierarchy. Each AS includes a set of geometries, and a geometry contains either triangle data, axis-aligned bounding box (AABB) data, or instance data. Triangle data includes: a vertex buffer, an index buffer, and a transformation matrix. AABB data includes the dimensions of the bounding box. Instance data is an array of elements each including: a transform matrix, a bottom-level AS (BLAS) reference, a shader binding table record index, and several values used in execution to control ray-tracing. Bottom level acceleration structures (BLAS) 202 represent basic objects (e.g., cylinder, cube, etc.) that are used to build up a more complex top level acceleration structure (TLAS) 210. Each BLAS 202 is associated with a set of geometries containing either triangle data or AABB data 204 (more generally referred to as geometry data 204). Each TLAS 210 is associated with instance data defining the position and orientation of an instance of a BLAS 202 within the 3D scene. There may be multiple instances of a BLAS 202 in a TLAS 210 to build up the 3D scene. Data about each instance of a BLAS 202 belonging to the TLAS 210 is stored in the instance buffer 162. The instance data includes an index for a record in a shader binding table buffer 164. The shader binding table buffer 164 stores a list of records. Shader binding table records (also referred to as shader records) store references to shaders and their associated data (e.g. values, arrays, matrices, textures, etc.). Each instance may thus refer to its own set of shaders. The application developer creates records for the ray-tracing shaders. A single record may be shared by multiple shaders of the same type (e.g. a record can be shared by more than one miss shader).

The data from the build step 200 is used for shader execution 250. During shader execution 250, shaders are called. A shader is a function that defines thread behavior. According to current standards, the main types of shaders used in ray-tracing are as follows. The ray generation shader 252 generates one or more rays for tracing. The ray generation shader 252 calls the function traceRayEXT( ) to initiate ray-tracing on each ray. The intersection shader 254 computes intersection (or a "hit") of a ray with non-triangular shapes specified by geometries containing AABB data. The any-hit shader 256 determines if a ray-hit should be ignored, committed, or terminated (e.g., to determine transparency of an object hit by a ray). The closest-hit shader 258 defines behavior (typically user-defined behavior) for the hit that is closest to the starting point of the ray and can call other callable shaders for rendering the ray. The miss shader 260 defines behavior (typically user-defined behavior) when a ray does not hit any object in the scene and can call other callable shaders. A sixth shader is the callable shader (not shown), which defines user-defined behavior and may call other callable shaders.

Each ray generated by the ray generation shader 252 is projected into the virtual scene containing ASs (as defined by the build step 200). Traversal of the ray through the scene (also referred to as AS traversal) is processed by the RTU 154 (or a dedicated traversal unit). As the ray traverses the scene, the intersection shader 254 and any-hit shader 256 are called (e.g., using the shader reference stored in the shader binding table buffer 164 for a given instance) to evaluate any ray-hits. After the ray has passed through the scene, the closest-hit shader 258 is called if at least one ray-hit is committed or terminated by the any-hit shader, otherwise the miss shader 260 is called. The process is repeated for each ray generated and for each thread.

In a typical implementation of ray-tracing in a GPU, the ray generation shader is executed by each respective thread in a single instruction, multiple data (SIMD) thread-group. A thread refers to a set of instructions that are executed in sequence. A thread-group (also referred to as a warp) is a set of threads that all execute the same sequence of instructions. The GPU processes the ray-hits of each thread in the SIMD thread-group without any coordination with the other threads in the thread-group. Consequently, differences in the ray-hits of each ray (e.g., intersecting different instances of geometry, or intersections being generated in a different order) can cause threads to diverge. Thread divergence refers to the situation where threads within the thread-group require execution of different sequences of instructions (e.g., threads require different shader calls, or threads require a different sequence of shader calls). In the present disclosure, shader calls may also be referred to as a type of function call, because a shader is a type of function. Because the same instructions must be executed at the same clock cycle for all threads in the thread-group, a simple solution that serializes divergent shader calls results in inefficient use of computing resources and poor performance, as will be illustrated in the example below.

In the following discussion, the types of shaders will be denoted as follows: I for the intersection shader, A for the any-hit shader, M for the miss shader, C for the closest-hit shader, and U for the callable shader (the ray generation shader is implied and not explicitly discussed). The rays are traced in a scene having multiple instances of triangular geometries and user-defined geometries. Each instance of a geometry is identified with an instance-identifier (ID), and a shader call for a particular instance will be referred to using the format Sj where S indicates the shader type and j indicates the instance-ID.

Thus, a thread (which executes the shader calls for a given ray) may require the following sequence of shader calls:

I1, A2, I3, A2, I4, A2, A2, A5, A5

It should be noted that the thread may have repeated calls (e.g., in this example, the any-hit shader (A) for instance-ID 5 is called twice), for example due to multiple intersections with the same instance of geometry (e.g., due to the geometry having a non-convex shape). Each call to the intersection shader may require an additional call to the any-hit shader if a ray-hit is generated. The any-hit shader may return a decision to ignore, commit, or terminate the ray-hit. After all ray-hits in the thread have been processed, the closest-hit shader is called if at least one ray-hit had the commit and/or terminate decision; otherwise, the miss shader is called.

The problem of thread divergence can occur when considering other threads in the thread-group.

FIGS. 3A-3C are tables that illustrate an example of thread divergence in a thread-group. In this simple example, there are four threads, however it should be understood that in practical application there may be greater (or fewer) number of threads, with greater (or fewer) number of ray-hits each. In these tables (and other tables discussed further below) the symbol→ is used to indicate a ray-hit produced by the intersection shader; the symbol ✓ is used to indicate a ray-hit is committed by the any-hit shader; and the symbol ⌐ is used to indicate a ray-hit is ignored by the any-hit or intersection shaders.

As shown in FIG. 3A, the first ray-hit for each thread in the thread-group is: {I1, A2, I4, A5} (in order from thread #1 to thread #4). Each thread in the thread-group requires execution of a different shader or execution of a shader for a different instance. However, in SIMD execution, threads with different shaders and instances cannot be executed at the same time in a thread-group. A simple solution is to execute the required shader calls serially, for example by executing I1, then I3, then A2, then A5. This may be implemented as a direct mapping of the control-flow logic of the traceRayEXT( ) function. Diverge shader calls may be implemented with a nonUniformCall which executes a shader call with each unique shader and instance-ID in sequence. However, in the worst case (e.g., where none of the threads have the same shader call at the same ray-hit index) such a serialized approach results in loss of parallelism by causing each thread to execute one at a time.

As indicated in FIG. 3A, the serialized approach results in a cost of 4 for processing the first ray-hit across all four threads, where the "cost" refers to a number of shader calls and thus indicates the computing resources (e.g., memory access, computing time) required to process the ray-hit.

As shown in FIG. 3B, the cost of computing resources accumulates as additional ray-hits are processed for each thread. As indicated in FIG. 3B, a call to the intersection shader may produce a ray-hit, which requires a call to the any-hit shader to get a decision to commit the ray-hit or ignore the ray-hit. There is some reduction in thread divergence for ray-hit #3, because thread #2 and thread #3 both require a call to the any-hit shader for instance-ID 5 (so the same instructions can be executed for these two threads together); however, the cost for processing ray-hit #3 across all four threads is still 3.

FIG. 3C illustrates the shader calls to complete processing all ray-hits for four threads, and the associated computing cost. A total of 37 shader calls is required. The most efficient execution of the thread-group is for processing ray-hit #9, where all four threads require execution of the any-hit shader for instance-ID 2, and the computing cost is 1 (which is the minimum computing cost possible).

As will be appreciated, the optimal situation is if all threads require the same shader call for the same instance-ID at the same ray-hit, for all of the ray-hits. However, this optimal situation is not reflective of practical ray-tracing applications, where a typical scene would have multiple objects that cause different interactions with different rays.

In the present disclosure, techniques to resolve the divergence issue are described in which shader calls are reordered and coalesced, to coordinate thread execution in a SIMD thread-group.

As previously mentioned, the GPU 150 includes a memory coalescing unit 158, which is used by the GPU 150 to coalesce memory accesses (e.g., for execution of load/store commands) by the memory address of the access, to improve performance. In the present disclosure, the merge coalesced accesses unit 168 and the function call coalescing buffer 166 is introduced to the architecture of the GPU 150. The merge coalesced accesses unit 168 coalesces identical function call pointers to reorder the ray-hits that are identified by the RTU 154, and stores the function call pointers in the function call coalescing buffer 166. The benefit of reordering ray-hits is illustrated by the example of FIG. 4

FIG. 4 is a table that illustrates the ray-hits of the same thread-group as FIGS. 3A-3C, however the function calls of each thread have been reordered, to coalesce calls to the same shader by different threads.

For example, in FIG. 3C, a call to the intersection shader for instance-ID 1 (indicated as I1 in the table) is found in each of threads #1-4, but at different ray-hit indices (e.g., at ray-hit #1 for thread #1; at ray-hit #2 for thread #2; at ray-hit #4 for thread #3; and at ray-hit #5 for thread #4). In FIG. 4, the shader calls of each thread have been reordered such that the call to I1 is at ray-hit #1 for all four threads. Thus, the computing cost for ray-hit #1 is 1. Similar reordering of shader calls is performed such that only one shader call is needed at each ray-hit, thus foregoing the need to serialize multiple shader calls for a given ray-hit.

Reordering the shader calls thus enables shader calls to be coalesced, and hence each thread in the thread-group is able to execute the function call in parallel rather than serializing the function calls. In this example, only 15 shader calls are required to process all four threads (for a total computing cost of 15), compared to 37 shader calls in the original order shown in FIG. 3C. It may be noted that some ray-hits are sparse, meaning that not all threads have a shader call to execute for that ray-hit (e.g., ray-hit #2 has a call to A1 for only threads #1 and #3, and threads #2 and #4 are dormant or waiting). Despite this sparsity, the reordering shown in FIG. 4 still provides significant performance improvement over the example of FIG. 3C.

Figure 5A:
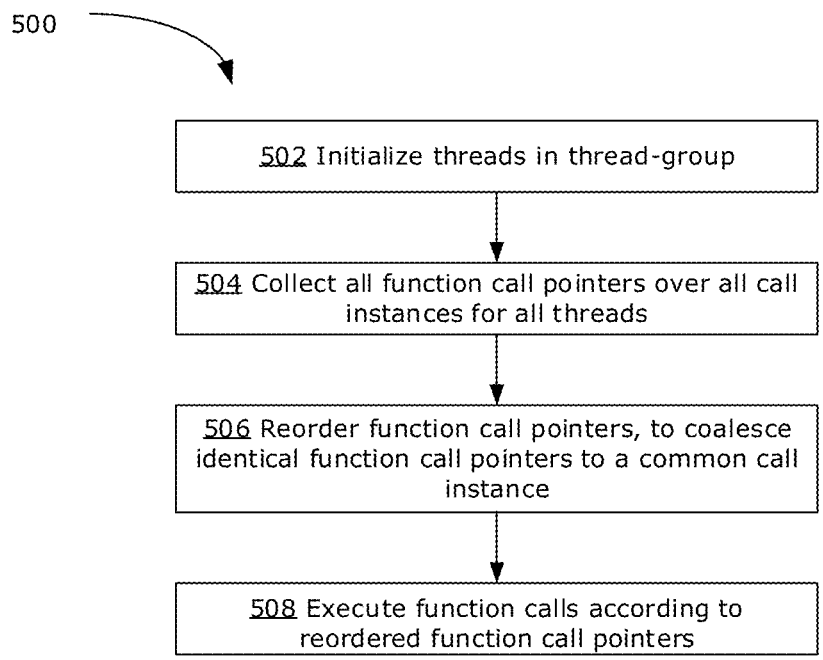
FIG. 5A is a flowchart illustrating an example method for reordering and coalescing function calls.

FIG. 5A is a flowchart illustrating an example method 500 for coalescing function calls. As will be discussed further below, the method 500 may be implemented specifically for ray-tracing applications. However, it should be understood that the method 500 may also be implemented for other applications in which function calls are made by threads in a thread-group. The method 500 may be performed by any processing unit capable of parallel thread execution, such as any suitable execution unit within the GPU 150. The method 500 may be used to reorder and coalesce function calls that are independent of each other (such that the function calls can be independently and individually reordered), to enable improved parallelism in thread execution.

At 502, a set of threads belonging to a thread-group is initialized. The threads belonging to a single thread-group are to be processed together in parallel. Initializing the set of threads may include determining the number of threads to be processed in the thread-group.

At 504, each thread is processed to collect the function calls to be executed over a respective number of call instances for each respective thread. It should be noted that the number of function calls (and hence the number of call instances) for each thread may be different for different threads.

Notably, at 504, the actual function calls are not executed yet, only the function call pointers are collected. Each function call pointer is the address in memory where the relevant instructions for executing the associated function call begin. Two function call pointers that indicate the same memory address (i.e., indicate identical function calls) are considered to be identical. On the other hand, two function call pointers that indicate different memory addresses (i.e., indicate different function calls) are considered to be non-identical. In the present disclosure, function call pointers that indicate identical function calls may be referred to as identical function call pointers, and function call pointers that indicate non-identical function calls may be referred to as non-identical function call pointers. Identical function calls can be executed at the same call instance for different threads (also referred to as parallel execution).

In some examples, if function calls make use of indexed data, collecting the function call pointers may also include collecting the associated data index to be used in the function call.

It should be noted that although the method 500 is described in the context of function call pointers, the function call pointers may be replaced with some other indicator of function calls (e.g., an index that references function calls, such as an index referencing an entry in the shader binding table)

At 506, the function call pointers are reordered, to coalesce identical function call pointers to a common call instance. If a thread has multiple instances of the same function call pointer over multiple call instances (i.e., the same function call is required to be executed multiple times in the thread), the reordering may place the multiple instances of the same function call pointer at consecutive call instances. Placing multiple instances of the same function call pointer at consecutive call instances in this way may enable more efficient use of hardware and/or more efficient use of memory resources. Non-identical functional call pointers are not permitted at the same call instance. As will be discussed further below, this reordering and coalescing of functional call pointers may be performed using dedicated hardware, such as the merged coalesced accesses unit 168 and the function call merging buffer 166.

In the case that the number of identical function call pointers is less than the number of threads, the identical function call pointers are grouped into a single common call instance, and one or more threads may be dormant or waiting during execution of the function call for that call instance (at step 508). In the case where a function call pointer is unique among all of the collected function call pointers (i.e., there is no other identical function call pointer), the unique function call pointer is assigned to a call instance by itself.

In some examples, if function calls make use of indexed data, the reordering and coalescing may also coalesce function call pointers based on the associated data index, such that identical function call pointers that are associated with the same data index are coalesced to the same call instance.

At 508, function calls are executed by the threads in the thread-group according to the reordered and coalesced function call pointers. In particular, the identical function calls that have been coalesced into a given call instance can all be executed in parallel across one or more threads in the thread-group. This operation may be carried out by first processing (or "popping") function call pointers from the function call coalescing buffer 166 one row at a time, as discussed further below, and then executing the function call.

In some examples, further performance improvements may be achieved by reordering function call pointers at step 506 such that pointers to memory addresses that are close together are ordered to be close together in the call instances (e.g., in consecutive call instances). Then prefetching may be able to retrieve a section of memory containing instructions for multiple function calls that are to be executed in sequence.

Figure 5B:
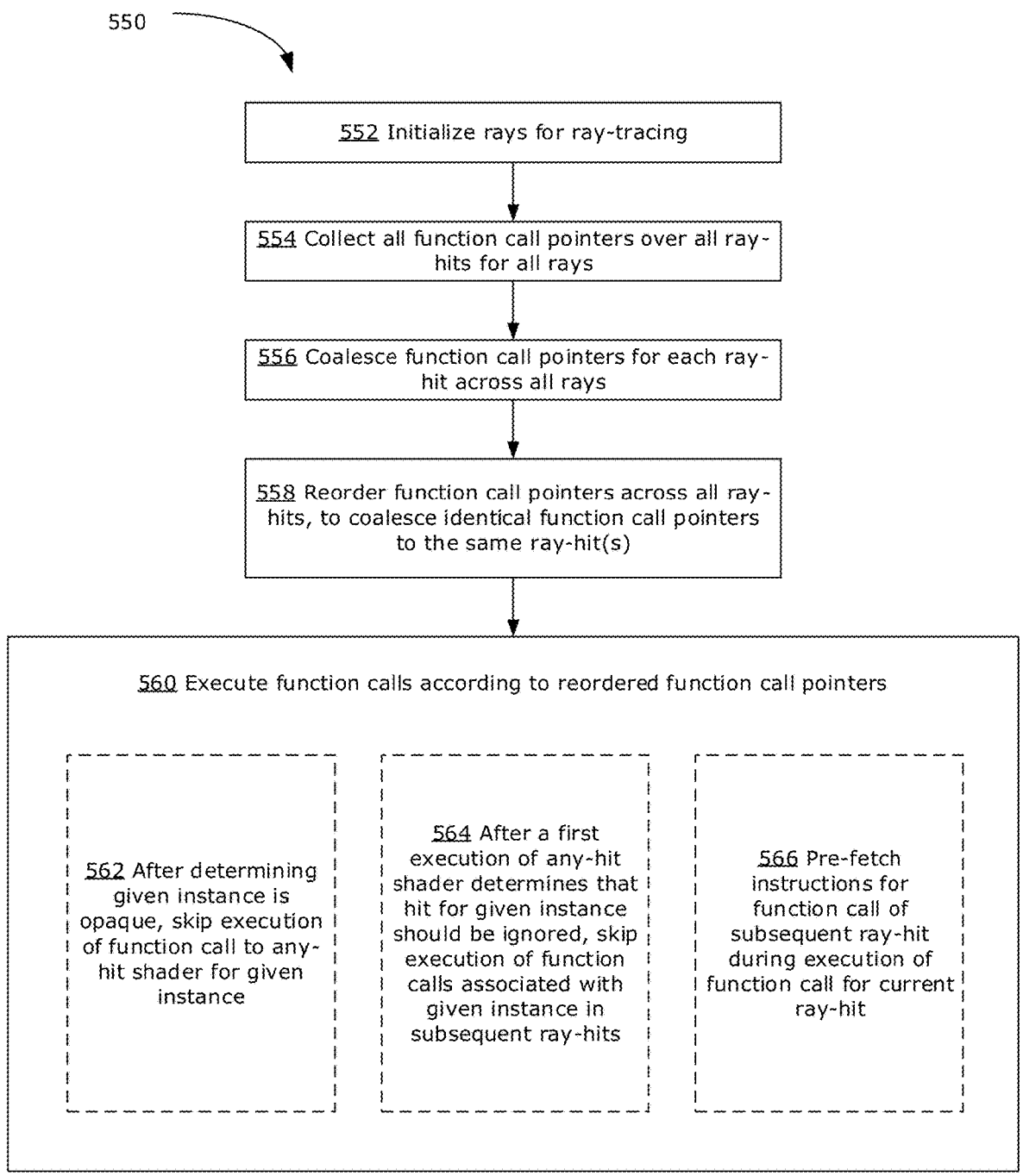
FIG. 5B is a flowchart illustrating an example implementation of the method of FIG. 5A, for ray-tracing applications.

FIG. 5B is a flowchart illustrating an example method 550 for coalescing shader calls for ray-tracing, in particular for coalescing function call pointers required to execute shader calls in ray-tracing. The method 550 is an example implementation of the method 500, in the context of ray-tracing. The method 550 may be performed by the GPU 150, for example using the RTU 154, memory coalescing unit 158 and merge coalesced accesses unit 168. Although the method 550 is described with reference to specific types of shader calls (e.g., for calling the any-hit shader and the intersection shader), it should be understood that the method 550 may be used to coalesce shader calls for any group of shaders that were independent of each other (such that the shader calls can be independently and individually reordered). Although the method 550 is described to use function call pointers as references to shader calls, it should be understood that the method 550 may be used to coalesce other references to shader calls such as instance-IDs.

Step 552 is an example implementation of step 502. At 552, a set of rays is initialized for ray-tracing. This may be performed using standard ray-tracing techniques, for example using the ray generation shader 252. The set of rays is initialized for a given thread-group, and are to be processed together in parallel threads. Initializing the set of rays may include determining the number of rays to be processed in the thread-group.

Step 554 is an example implementation of step 504. At 554, each ray is processed to get a respective set of function call pointers over a respective number of sequential ray-hits (e.g., using the RTU 154), where each ray-hit is a call instance. The function call pointers over all ray-hits for all rays are collected.

Notably, at 554, the actual function calls are not executed yet, only the function call pointers are collected. In the context of ray-tracing, a function call pointer indicates the memory address for retrieving the instructions for executing a particular shader (such as the any-hit shader 256 or the intersection shader 254) for a particular instance of a virtual object in the virtual 3D scene (e.g., as identified by the unique instance ID for that instance).

Steps 556 and 558 together are an example implementation of step 506. At 556, the function call pointers for each given ray-hit are coalesced across all rays in the thread-group. Or more generally, the function call pointers for each given call instance are coalesced across all threads in the thread-group. For example, this operation may be carried out using the memory coalescing unit 158. The memory coalescing unit 158 may perform typical memory coalescing operations to coalesce identical memory accesses (indicated by identical function call pointers) for a given ray-hit into a single memory access. Notably, the memory coalescing unit 158 serves to coalesce function call pointers without changing the order of the function call pointers. That is, function call pointers that are identical but at different ray-hit indices are not coalesced by the memory coalescing unit 158.

At 558, the function call pointers are further reordered across all ray-hits, to coalesce identical function call pointers (regardless of ray-hit index) to the same set of one or more ray-hits. As will be discussed further below, this operation may be carried out using the merge coalesced accesses unit 168 together with the function call coalescing buffer 166 (where each row in the function call coalescing buffer 166 corresponds to a respective ray-hit, for example the row index in the function call coalescing buffer 166 may correspond to the ray-hit index). Identical function call pointers are grouped into the same ray-hit(s), and each ray-hit is assigned only identical function call pointers. Non-identical function call pointers are assigned to different ray-hits.

At 560, function calls are executed according to the reordered function call pointers. In particular, the identical function calls that have been coalesced into a given ray-hit can all be executed in parallel. This operation may be carried out by first processing (or "popping") function call pointers from the function call coalescing buffer 166 one row at a time, as discussed further below, and then executing the function call.

Because the ray-hits are independent of each other, the shader calls made when processing the ray-hits can be executed in any order without affecting the end result. For example, execution of the any-hit shader 256 for each instance is independent of execution of the any-hit shader 256 for any other instance, and the order of execution does not affect the determination by the any-hit shader 256 of any instance to commit, ignore or terminate. Similarly, execution of the any-hit shader 256 is not dependent on execution of the intersection shader 254 (and vice versa). It should be noted that although a given function may call on another function (e.g., the intersection shader 254 may call the any-hit shader 256 if a hit is produced), however the actual execution of the intersection shader 254 and the any-hit shader 256 are independent of each other, in that the results returned by each shader 254, 256 are not dependent on each other.

In ray-tracing applications, where a function call may be indicated by an entry in the shader binding table 164 that is referenced by the instance-ID, the reordering and coalescing may be performed on instance-IDs instead of function call pointers.

As illustrated in FIG. 5, carrying out step 560 may include carrying out optional steps 562, 564 and/or 566. It should be noted that the steps 562, 564, 566 are independent of each other, and are not necessarily performed in any particular order. Optional steps 562, 564, 566 may be performed to provide additional performance improvements (e.g., increased efficiency), in addition to the performance improvements that may be achieved by the method 550.

At optional step 562, if a given object instance has been flagged as being opaque, it may not be necessary to execute the any-hit shader 256 for that given instance. The any-hit shader 256 should return a decision to commit for all opaque instances, hence execution of the any-hit shader 256 can be skipped and instead all hits to opaque instances can be committed by default. This may help to improve performance, for example by omitting unnecessary memory accesses to retrieve instructions for the any-hit shader 256 for opaque instances.

At optional step 564, if an execution of the any-hit shader 256 for a given object instance returns the decision that the hit should be ignored, then subsequent function calls (in subsequent ray-hits) associated with that given instance can be skipped. It is expected that if the any-hit shader 256 returns a decision to ignore a hit for the given instance (e.g., if the instance is defined to be transparent), the given instance should be ignored for all hits. This may help to improve performance, for example by omitting unnecessary memory accesses to retrieve instructions for ignored instances.

At optional step 566, instructions for the function call in a subsequent ray-hit (or in multiple subsequent ray-hits) may be prefetched concurrent with execution of the function call for a current ray-hit. A subsequent ray-hit may be the next ray-hit immediately following the current ray-hit, or may be any ray-hit that follows the current ray-hit in the sequence of ray-hits. Because the function call pointers are collected first and actual execution of the function calls is delayed, the function calls that need to be executed are known ahead of actual execution. In particular, the order in which function calls are to be executed is defined by the reordering performed at step 558. Thus, it is possible to retrieve the instructions for the function call to be executed in subsequent ray-hit(s) from the slower memory where the instructions are stored (e.g., the system memory 110) into a faster and/or more local memory (e.g., the GPU memory 156 or a GPU cache (not shown)) to enable faster access.

In some examples, further performance improvements may be achieved by reordering function call pointers at step 558 such that pointers to memory addresses that are close together are ordered to be grouped together in the ray-hits (e.g., in consecutive ray-hits). Then prefetching may be able to retrieve a section of memory containing instructions for multiple function calls that are to be executed in sequence.

In conventional ray-tracing, function calls are executed dynamically as the list of ray-hits is generated for each ray. This means that it is typically not possible to prefetch instructions into the cache of the GPU 150. Hence, the benefits of prefetching instructions, as discussed above, typically are not achieved (or would be difficult to achieve) in conventional ray-tracing.

FIGS. 6A-6D will now be discussed, showing some example pseudocode, which may be executed by the GPU 150 to implement examples of the method 550. It should be understood that this pseudocode is provided only for the purpose of illustration and is not intended to limit how the present disclosure is implemented.

In FIG. 6A, the pseudocode 600 includes a while loop 610 that is used to perform steps 554-558. In particular, the while loop 610 processes all ray-hits in the thread-group and collects the function call pointer ("pc" in the pseudocode 600) for the intersection shader 254 and the any-hit shader 256. The function calls are not executed, but rather the function call pointers are queued to the memory coalescing unit 158 (as indicated in lines 616*a* and 616*b*). As will be discussed further below, function call pointers that are queued to the memory coalescing unit 158 are further reordered and the function call pointers merged, using the merge coalesced accesses unit 168 and the function call coalescing buffer 166. It should be noted that this operation of collecting and coalescing function calls may be implemented in software (as shown in the pseudocode 600) or may be implemented by coding into the initializeRayHits( ) function.

In the example shown, at line 612 of the pseudocode 600, the function getNextRayBasicInfo( ) returns the shader binding table offset (for accessing the shading binding table buffer 164), whether the instance that was hit is a non-triangle geometry (i.e., is an access aligned bounding box (AABB)), and the ray-hit index. The function getNextRayBasicInfo( ) thus extracts only basic information for a ray-hit.

Using the information extracted by getNextRayBasicInfo( ) the function call pointers are collected for calling the any-hit shader 256 and/or the intersection shader 254 for the ray-hit. Because the intersection shader 254 may call the any-hit shader 256 (for AABB objects), at line 614 of the pseudocode 600, the function getIntersection&AnyHitShader( ) combines the any-hit shader 256 and the intersection shader 254 into a single combined shader.

In some examples, the function call pointer may be stored directly in the acceleration structure so that the function getNextRayBasicInfo( ) can directly get the function call pointer as well as the shader binding table offset (thus eliminating the need to compute the shader binding table offset and load the function call pointer prior to calling getAnyHitShader( ) or getIntersection&AnyHitShader( ) functions).

The pseudocode 600 also includes a for loop 620 that is used to perform the execution step 560 of the method 550. The actual execution of function calls is found in the for loop 620.

At line 622 of the pseudocode 600, each thread gets the function call pointer for the next ray-hit from the merged coalesced accesses unit 168 by popping the next row of the function call coalescing buffer 166 (i.e., corresponding to the next ray-hit). It should be noted that the function call pointer for the next ray-hit can be an invalid value. This means the threads is not active for the next ray-hit (e.g., in the case where the ray-hit is sparse). It may be noted that at queuing to the memory coalescing unit 158, the ray-hit index ("hit_index" in the pseudocode 600) was linked to the function call pointer. Thus, when the next ray-hit is popped, the index is also returned.

At line 624 of the pseudocode 600, the ray-hit index is used to query the full ray-hit information, which is used to perform the function call along with the function call pointer.

In some examples, execution of the function calls may be accelerated using a finite state machine (e.g., using a function Call_RayTrace_Hit_Functions( )). The function call pointers can then be directly queried from the function call coalescing buffer 166.

As mentioned above with reference to FIG. 5B, some optional steps (e.g., steps 562, 564 and/or 566) may be performed as part of the execution step 560, which may affect implementation in the pseudocode 600.

For example, the while loop 610 may be replaced with the while loop 610*a* of FIG. 6B, to reorder function calls by coalescing instance-IDs instead of function call pointers. This may be implemented, as illustrated by line 618, by queueing instance-IDs instead of function call pointers to the memory coalescing unit 158 (compare with lines 616*a*, 616*b* of FIG. 6A).

In another example, the for loop 620 may be replaced with the for loop 620*a* of FIG. 6C, to skip calling the any-hit shader for any instances that have been flagged as opaque (e.g., as described for optional step 562). As illustrated by line 626, a function call is made only if the instance is not opaque ("!hit.is_opaque" in the pseudocode). If an instance is flagged as opaque, the function call within the if statement is skipped and the hit is automatically committed.

In another example, the for loop 620 may be replaced with the for loop 620b of FIG. 6D, to skip processing of subsequent hits to a given instance after the first execution of the any-hit shader 256 returns a decision to ignore the ray-hit for that given instance (e.g., as described for optional step 564). Lines 628a and 628b in particular illustrate how this may be implemented in software.

Figure 7A:
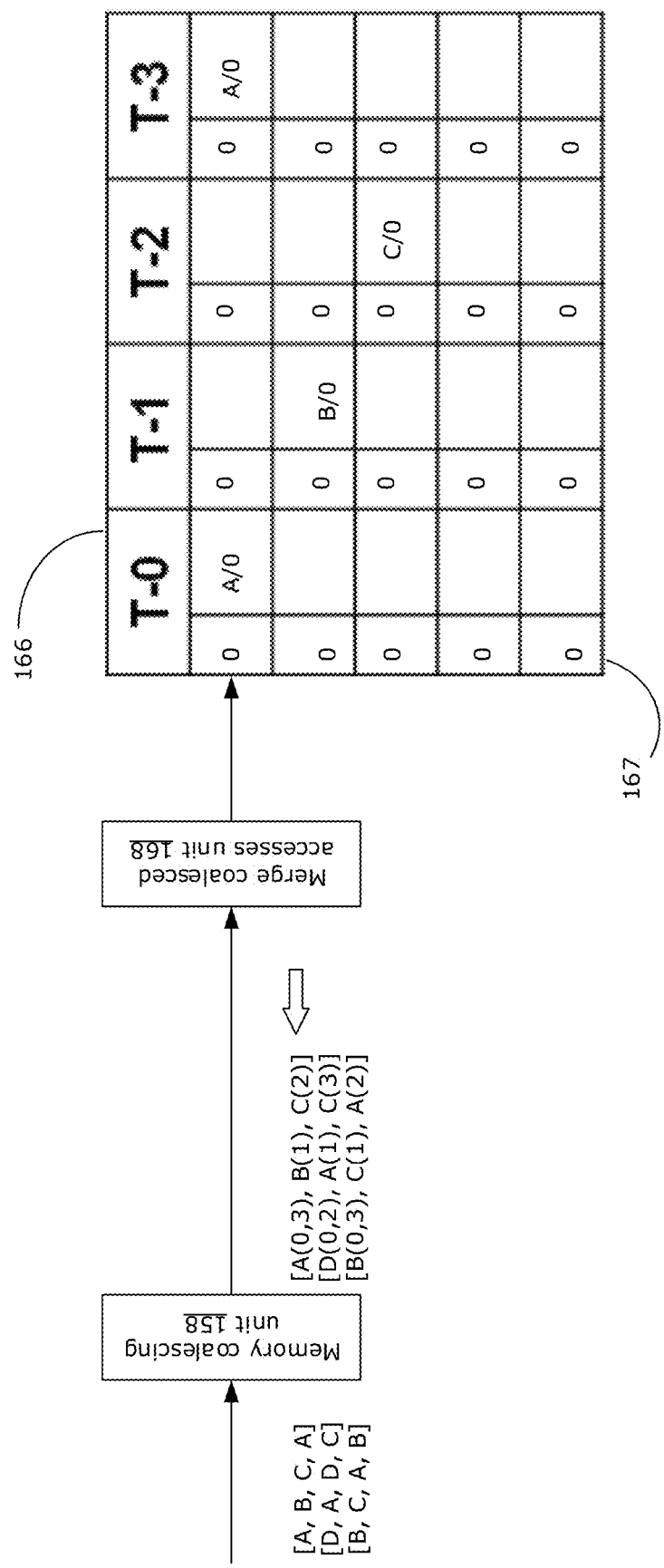
FIGS. 7A-7C illustrate an example hardware implementation of the method of FIG. 5B.
Figure 7B:
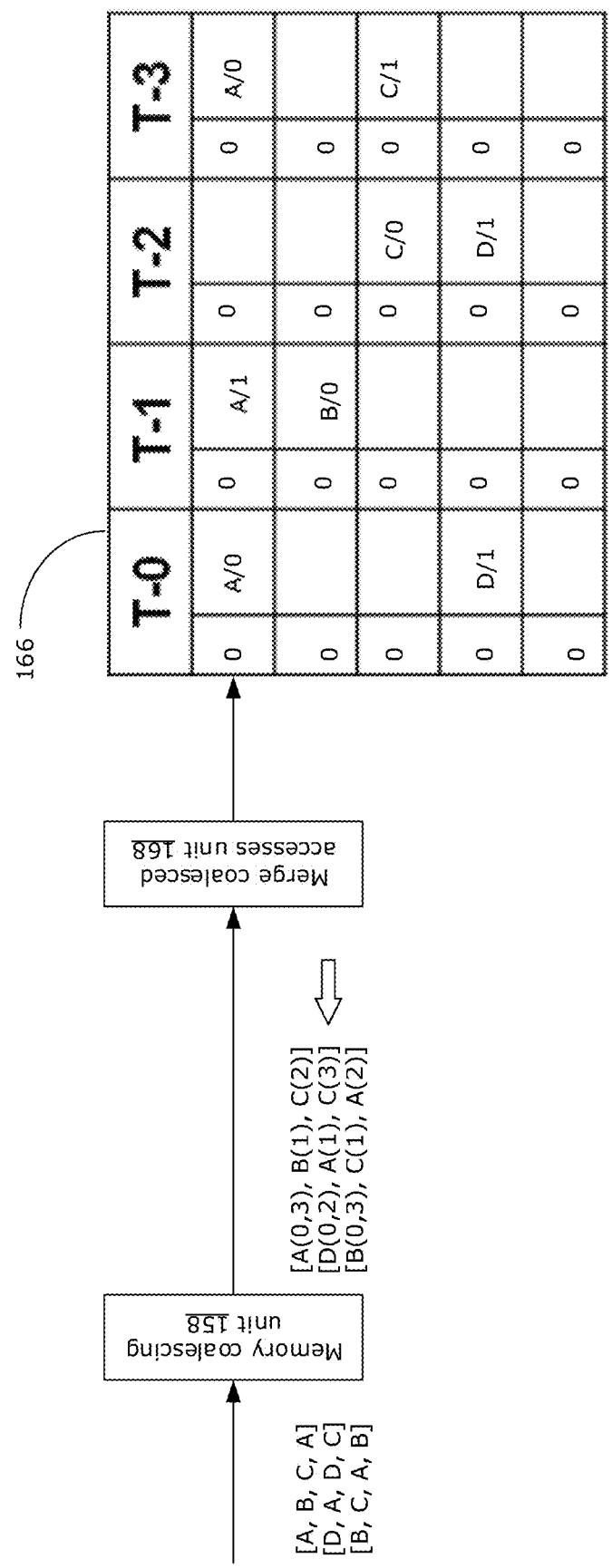
Figure 7C:
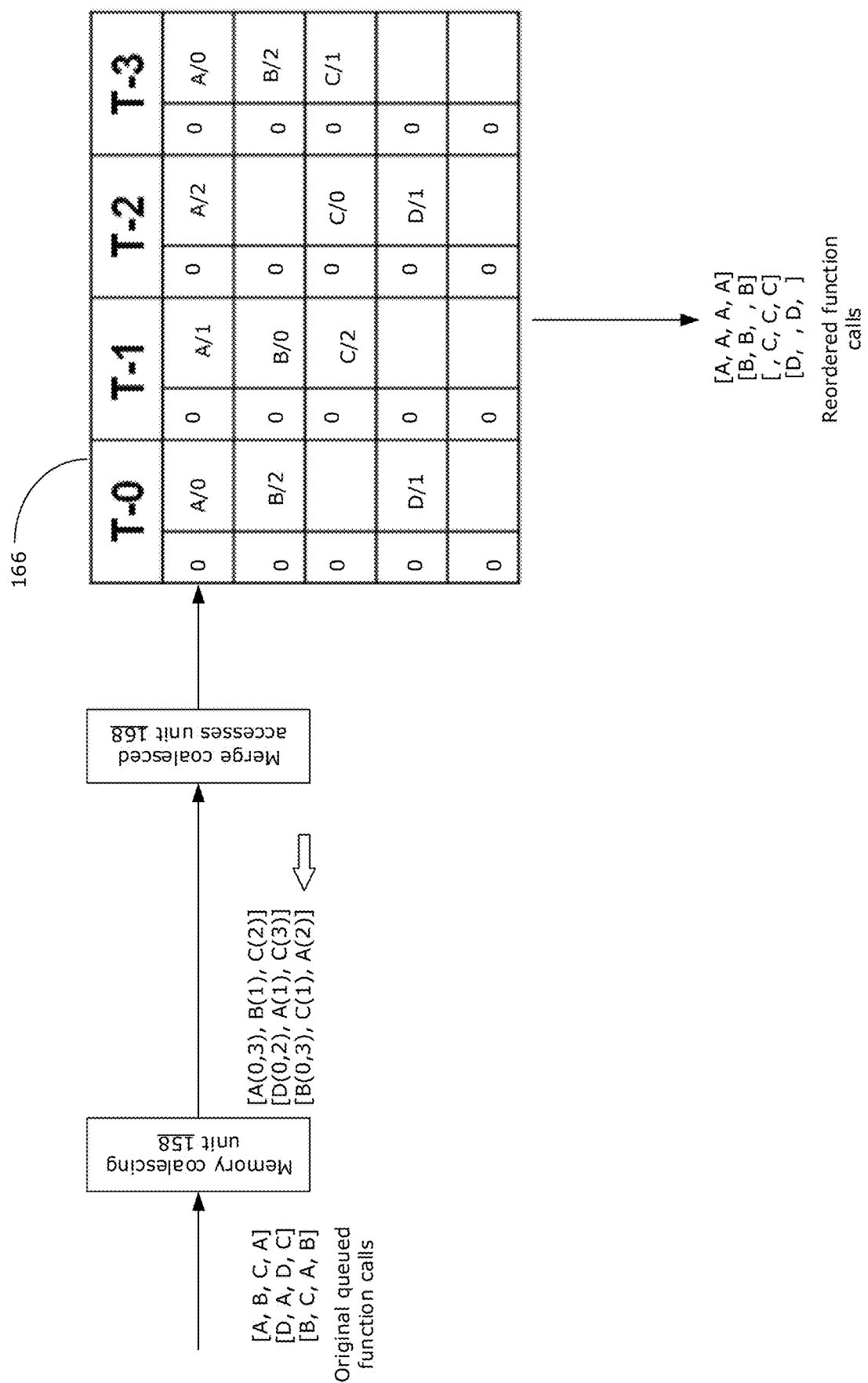

FIGS. 7A-7C are now discussed, illustrating an example implementation of the method 550 using the memory coalescing unit 158, the merge coalesced accesses unit 168 and the function call coalescing buffer 166. In particular, FIGS. 7A-7C illustrate how function call pointers are coalesced and reordered, then subsequently executed according to the reordering. It should be understood that the method 550 (and more generally the method 500) may be carried out using a different hardware implementation. For example, instead of separate hardware units 158, 168, a single hardware unit may be perform the reordering and coalescing of the function call pointers (with or without using the buffer 166).

Starting at FIG. 7A, a simple example is shown in which a thread-group has four rays (or threads). The function call coalescing buffer 166 in this example is represented as a table having a width corresponding to the number of rays (indicated as T-0, T-1, T-2 and T-3 for each of the four rays). However, it should be understood that the function call coalescing buffer 166 may have any suitable structure, and any suitable size (e.g., may be large enough to hold the function call pointers for an expected maximum number of ray-hits over an expected maximum number of rays, for example as defined by a standard or according to GPU specification). Generally, the size of the function call coalescing buffer 166 may be set as a property of the hardware of the GPU 150.

The function call coalescing buffer 166 also stores ignore flags 167 (e.g., 1-bit values) which may be used to carry out optional steps 562 and/or 564. For example, if the function ignore_subsequence_raytrace_hits( ) is called for a given instance (e.g., as shown in FIG. 6D), the ignore flags 167 corresponding to function call pointers for that given instance may be set to "1" to indicate that those function call pointers can be skipped.

The RTU 154 has determined three ray-hits for each ray. Each ray-hit for each ray corresponds to a function call (e.g., a call to a specific shader for a specific instance-ID), which is indicated by a function call pointer. For simplicity, each unique function call pointer is represented by one of "A", "B", "C" or "D". The RTU 154 may call the queue_to_coalesce_raytrace_hit( ) (as shown in the pseudocode 600) to provide the function call pointers to the memory coalescing unit 158. For example, each queue_to_coalesce_raytrace_hit( ) call may provide a vector of function call pointers having a length equal to the number of rays in the thread-group, where each vector corresponds to a given ray-hit index. For example, FIG. 7A shows the three vectors [A, B, C, A], [D, A, D, C] and [B, C, A, B] provided to the memory coalescing unit 158, corresponding to the three ray-hits in the thread-group. It should be noted that although FIG. 7A shows three vectors being provided to the memory coalescing unit 158, the vectors may be provided to the memory coalescing unit 158 one by one (e.g., with each call of queue_to_coalesce_raytrace_hit( )) and the memory coalescing unit 158 may generate a vector of coalesced memory access as each vector is provided from the RTU 154.

The memory coalescing unit 158 coalesces identical memory accesses within each vector (i.e., for a given ray-hit index) into a single memory access. For example, the memory access associated with the function call "A" is found twice in the first vector, which the memory coalescing unit has coalesced into a single memory access. FIG. 7A denotes this coalesced memory access as "A(0,3)" to indicate that this memory access is being executed for ray #0 and ray #3. In conventional operation, the memory coalescing unit 158 typically then broadcasts the coalesced memory accesses to the threads to be executed. In the present disclosure, the coalesced memory accesses are further processed by the merge coalesced accesses unit 168.

The merge coalesced accesses unit 168 processes the vectors from the memory coalescing unit 158 one by one. The merge coalesced accesses unit 168 merges the coalesced memory accesses into the function call coalescing buffer 166. It should be noted that although FIG. 7A shows three vectors being provided to the merge coalesced accesses unit 168, the vectors may be provided to the merge coalesced accesses unit 168 one by one (e.g., as each vector of coalesced memory accesses is generated by the memory coalescing unit 158), and the merge coalesced accesses unit 168 may populate the function call coalescing buffer 166 as each vector is provided by the memory coalescing unit 158.

Function call pointers are stored into the function call coalescing buffer 166 by writing identical function call pointers into the same row of the function call coalescing buffer 166. The function call pointers are written into a column of the function call coalescing buffer 166 corresponding to the appropriate ray index. FIG. 7A shows the function call coalescing buffer 166 after the merge coalesced accesses unit 168 has processed the first vector (indicated by white arrow). For example, the memory access for A(0,3) is written into the function call coalescing buffer 166 in the same first row, at columns T-0 and T-3. Non-identical function call pointers (e.g., B and C) are written into different rows (corresponding to different ray-hit indices) of the function call coalescing buffer 166. In this example, each entry in the function call coalescing buffer 166 is denoted with "/0" to indicate that the function call pointer corresponds to the first vector. In some examples, tracking each entry in the function call coalescing buffer 166 in this way may enable correct execution of function calls (e.g., by ensuring that the correct input data is used for each function call). In other implementations it may not be necessary to track which vector is the source of each function call pointer in the function call coalescing buffer 166.

FIG. 7B illustrates the function call coalescing buffer 166 after the merge coalesced accesses unit 168 has processed the second vector (indicated by white arrow). Notably, function call pointers for identical function calls are written into the same row of the function call coalescing buffer 166 regardless of whether the function call pointer was from the first vector (denoted with "/0") or the second vector (denoted with "/1"). For example, the first row of the function call coalescing buffer 166 contains function call pointer A from different vectors. The effect is that the function call pointer A for ray #1 has been reordered to be at ray-hit index 0 (instead of original ray-hit index 1).

FIG. 7C illustrates the function call coalescing buffer 166 after the merge coalesced accesses unit 168 has processed the third vector (indicated by white arrow). After the merge coalesced accesses unit 168 has processed all vectors from the memory coalescing unit 158, writing to the function call coalescing buffer 166 is complete. Each row (corresponding to a reordered ray-hit index) of the function call coalescing buffer 166 is then processed by the GPU 150 (e.g., by calling the function pop_next_raytrace_hit( ) as shown in the pseudocode 600) and the corresponding function call for each row is executed. The result is a set of reordered function calls, where each vector corresponds to a row of the function call coalescing buffer 166 (corresponding a ray-hit across all four rays). Since each row of the function call coalescing buffer 166 contains identical function call pointers, this means that processing a row of the function call coalescing buffer 166 enables parallel execution across multiple threads, and serialization is avoided.

As shown in FIG. 7C, the reordered function calls are processed as four vectors, corresponding to four ray-hits for each of the four rays in the thread-group. Compared to the original vectors that were queued to the memory coalescing unit, the reordered function calls have more ray-hits (four vectors in the coalesced function calls compared to three vectors in the original queued function calls), however only four function calls are required in the reordered function calls, compared to nine function calls (due to serialization of divergent threads) in the original queued function calls.

As illustrated, the function call coalescing buffer 166 may have sparse rows (i.e., rows that do not contain function call pointers for all rays), with the result that there may be idling of individual rays within the thread-group at some ray-hits. The reduction of serialized function calls is significant enough to make up for any loss of efficiency due to such idling.

In this example, there is no duplication of function call pointers per ray (e.g., the function call "A" is found only once per ray). In other examples, the same function call pointer may appear multiple times in a given ray. In such examples, there may be multiple corresponding rows in the function call coalescing buffer 166 to store the repeated, same function call pointers for that ray.

As previously mentioned, the function call coalescing buffer 166 may be sized to store function call pointers over an expected number of ray-hits for an expected number of rays in a thread-group. In some examples, if the function call coalescing buffer 166 is full, the function call pointers already stored in the function call coalescing buffer 166 may all be processed. Excess function call pointers are queued to be processed by the merge coalesced accesses unit 168 after the function call coalescing buffer 166 has been emptied. Alternatively, if the function call coalescing buffer 166 is full, excess function call pointers may be processed in the conventional way (e.g., using serialization) instead of coalescing. For example, in the pseudocode 600, the queue_to_coalesce_raytrace_hit( ) function may return the remaining capacity of the function call coalescing buffer 166, and if the function call coalescing buffer 166 is full this may trigger an exit from the while loop 610 (i.e., stop collecting function call pointers for coalescing). Alternatively, if the function call coalescing buffer 166 is full, excess function call pointers may be stored to memory.

The reordering and coalescing of function calls as disclosed herein (for example using method 550 and/or pseudocode 600, and as illustrated in FIGS. 7A-7C) enables improvements in performance by enabling greater parallelization of thread execution in a thread-group (and hence fewer function calls), particularly where there is thread divergence in the originally ordered function calls across the threads. Greater parallelism in thread execution helps to reduce total execution time and/or reduce the required processing power. In the context of ray-tracing, such improvements may enable more practical applications for ray-tracing.

The present disclosure describes methods and apparatuses for reordering and coalescing function calls, which may be implemented using the existing memory coalescing hardware unit and presently disclosed merge coalescing access unit and function call coalescing buffer. Although described with respect to certain specialized hardware instructions (which may enable greater performance improvements and/or power savings), examples of the present disclosure may also be implemented as software instructions on the GPU.

In some examples, prefetching may be used to achieve additional performance improvements, for example using a specialized prefetching hardware unit. Function call pointers may be reordered such that pointers to memory addresses that are close to each other in the memory are ordered consecutively. This may also help with reducing instruction cache misses.

The present disclosure has described examples in the context of ray-tracing. It should be understood that this is only for the purpose of illustration and is not necessarily limiting to the scope of the present disclosure.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for thread execution, comprising:
    processing all threads belonging to a thread-group to collect all function call indicators over all call instances and over all the threads, wherein each respective thread comprises a respective set of function call indicators, each function call indicator being associated with a corresponding call instance within the respective thread;
    reordering the function call indicators within each respective thread, to coalesce identical function call indicators from different threads of the thread-group to a common set of one or more call instances, and wherein non-identical function call indicators are prohibited from being reordered to a same call instance such that, when all the threads in the thread-group are executed together, each call instance executes only one function across all the threads; and
    executing function calls across all the threads of the thread-group, according to the reordered and coalesced function call indicators.

2. The method of claim 1, further comprising:
    concurrent with execution of a function call across one or more threads of the thread-group, the function call being indicated by a function call indicator corresponding to a current call instance, prefetching instructions for a subsequent function call to be executed across a same or different one or more threads of the thread-group, the subsequent function call being indicated by a subsequent function call indicator corresponding to a subsequent call instance.

3. The method of claim 2, wherein reordering the function call indicators comprises:
    reordering two non-identical function call indicators within a given thread, which indicate memory addresses close to each other, to be assigned to two consecutive call instances.

4. The method of claim 1, wherein reordering the function call indicators comprises:
    representing all the function call indicators over all the call instances and over all the threads as a plurality of vectors, each respective vector containing a set of function call indicators belonging to a respective given call instance across all the threads in the thread-group;
    processing the plurality of vectors by, for each respective vector:
        writing identical function call indicators belonging to the respective vector to a common row in a buffer, non-identical function call indicators being written to different rows in the buffer;
        wherein identical function call indicators belonging to different vectors are written to the common row in the buffer; and
    wherein executing function calls comprises:
        executing function calls indicated by function call indicators retrieved row by row from the buffer.

5. The method of claim 1, wherein the function call indicators are function call pointers.

6. The method of claim 1, wherein reordering the function call indicators comprises:
    for each given call instance, coalescing identical function call indicators across all the threads in the thread-group, to obtain a set of coalesced function call indicators for the given call instance; and
    reordering the coalesced function call indicators across all call instances to place identical coalesced function call indicators at the common call instance.

7. The method of claim 1, wherein the threads represent rays in a ray-tracing process, wherein each call instance in a thread corresponds to a ray-hit of a ray, and wherein each function call corresponds to a shader call.

8. The method of claim 7, wherein the respective set of function call indicators collected for each ray includes at least one of: a function call indicator to an any-hit shader, a function call indicator to an intersection shader, or a function call indicator to a combined any-hit and intersection shader.

9. The method of claim 7, wherein each function call is associated with an object instance and a shader, and executing function calls comprises:
    determining that a given object instance associated with a function call to an any-hit shader is flagged as opaque; and
    omitting execution of the function call to the any-hit shader for the given object instance.

10. The method of claim 7, wherein each function call is associated with an object instance and a shader, wherein executing function calls comprises:
    executing a function call to an any-hit shader for a given object instance; and
    after determining that the function call returns a decision to ignore a hit for the given object instance, omitting execution of subsequent function calls associated with the given object instance.

11. An apparatus for thread execution, comprising:
    a graphics processing unit (GPU) configured to:
    process all threads belonging to a thread-group to collect all function call indicators over all call instances and over all the threads, wherein each thread comprises a respective set of function call indicators, each function call indicator being associated with a corresponding call instance within the respective thread;
    reorder the function call indicators within each respective thread, to coalesce identical function call indicators from different threads of the thread-group to a common set of one or more call instances, and wherein non-identical function call indicators are prohibited from being reordered to a same call instance such that, when all the threads in the thread-group are executed together, each call instance executes only one function across all the threads; and
    execute function calls across all the threads of the thread-group, according to the reordered and coalesced function call indicators.

12. The apparatus of claim 11, wherein the GPU is further configured to:
    concurrent with execution of a function call across one or more threads of the thread-group, the function call being indicated by a function call indicator corresponding to a current call instance, prefetch instructions for a subsequent function call to be executed across a same or different one or more threads of the thread-group, the subsequent function call being indicated by a subsequent function call indicator corresponding to a subsequent call instance.

13. The apparatus of claim 12, wherein the GPU is further configured to reorder the function call indicators by:
    reordering two non-identical function call indicators within a given thread, which indicate memory addresses close to each other, to be assigned to two consecutive call instances.

14. The apparatus of claim 11, wherein the GPU is further configured to reorder the function call indicators by:
    representing all the function call indicators over all the call instances and over all the threads as a plurality of vectors, each respective vector containing a set of function call indicators belonging to a respective given call instance across all the threads in the thread-group;

processing the plurality of vectors by, for each respective vector:
writing identical function call indicators belonging to the respective vector to a common row in a function call coalescing buffer, non-identical function call indicators being written to different rows in the function call coalescing buffer;
wherein identical function call indicators belonging to different vectors are written to the common row in the buffer; and wherein the GPU is further configured to execute function calls by:
executing function calls indicated by function call indicators retrieved row by row from the function call coalescing buffer.

15. The apparatus of claim 11, wherein the GPU comprises:
a memory coalescing unit; and
a merge coalesced accesses unit;
wherein the memory coalescing unit and the merge coalesced accesses unit are configured to reorder the function call indicators by:
at the memory coalescing unit:
for each given call instance, coalescing identical function call indicators across all the threads in the thread-group, to obtain a set of coalesced function call indicators for the given call instance; and
at the merge coalesced accesses unit:
reordering the coalesced function call indicators across all call instances to place identical coalesced function call indicators at the common call instance.

16. The apparatus of claim 11, wherein the threads represent rays in a ray-tracing process, wherein each call instance in a thread corresponds to a ray-hit of a ray, and wherein each function call corresponds to a shader call.

17. The apparatus of claim 16, wherein the respective set of function call indicators collected for each ray includes at least one of: a function call indicator to an any-hit shader, a function call indicator to an intersection shader, or a function call indicator to a combined any-hit and intersection shader.

18. The apparatus of claim 16, wherein each function call is associated with an object instance and a shader, and wherein the GPU is further configured to execute function calls by:
determining that a given object instance associated with a function call to an any-hit shader is flagged as opaque; and
omitting execution of the function call to the any-hit shader for the given object instance.

19. The apparatus of claim 16, wherein each function call is associated with an object instance and a shader, and wherein the GPU is further configured to execute function calls by:
executing a function call to an any-hit shader for a given object instance; and
after determining that the function call returns a decision to ignore a hit for the given object instance, omitting execution of subsequent function calls associated with the given object instance.

20. A non-transitory computer readable medium having instructions stored thereon, wherein the instructions, when executed by a graphics processing unit (GPU), cause the GPU to:
process all threads belonging to a thread-group to collect all function call indicators over all call instances and over all the threads, wherein each thread comprises a respective set of function call indicators, each function call indicator being associated with a corresponding call instance within the respective thread;
reorder the function call indicators within each respective thread, to coalesce identical function call indicators from different threads of the thread-group to a common set of one or more call instances, and wherein non-identical function call indicators are prohibited from being reordered to a same call instance such that, when all the threads in the thread-group are executed together, each call instance executes only one function across all the threads; and
execute function calls across all the threads of the thread-group, according to the reordered and coalesced function call indicators.

* * * * *